United States Patent [19]
Brown et al.

[11] Patent Number: 5,707,577
[45] Date of Patent: Jan. 13, 1998

[54] METHOD AND APPARATUS FOR RESTRAINING PLASTIC MATERIAL IN INSULATED RUNNER SYSTEM FROM CONTACTING MOLD PARTS UPON SEPARATION THEREOF

[75] Inventors: Paul Philip Brown, Carlsbad, Calif.; Jens Ole Sorensen, Grand Cayman, Cayman Islands

[73] Assignee: Universal Ventures, Cayman Islands

[21] Appl. No.: 650,720

[22] Filed: May 20, 1996

[51] Int. Cl.[6] .................................................. B29C 45/40
[52] U.S. Cl. .............................. 264/328.1; 264/328.8; 264/334; 425/556; 425/572; 425/588
[58] Field of Search ........................... 264/328.1, 328.8, 264/334; 425/572, 588, 556

[56] References Cited

U.S. PATENT DOCUMENTS

| | | | |
|---|---|---|---|
| 4,118,168 | 10/1978 | Rees et al. | 425/556 |
| 4,981,634 | 1/1991 | Maus et al. | 264/334 |
| 5,472,335 | 12/1995 | Morikita | 264/334 |

FOREIGN PATENT DOCUMENTS

| | | | |
|---|---|---|---|
| 1546269 | 2/1990 | U.S.S.R. | 425/556 |

*Primary Examiner*—Tim Heitbrink
*Attorney, Agent, or Firm*—Edward W. Callan

[57] ABSTRACT

In an injection molding apparatus in which first and second mold parts are combined to define therebetween an insulated section of a runner system through which molten plastic material is injected into at least one mold cavity, spring-biased plungers are included in at least one of the first and second mold parts for restraining a shell of plastic material within at least a part of the insulated section of the runner system from contacting any portion of at least one of the mold parts within the insulated section of the runner system other than the plungers when the first and second mold parts are separated from one another.

17 Claims, 6 Drawing Sheets

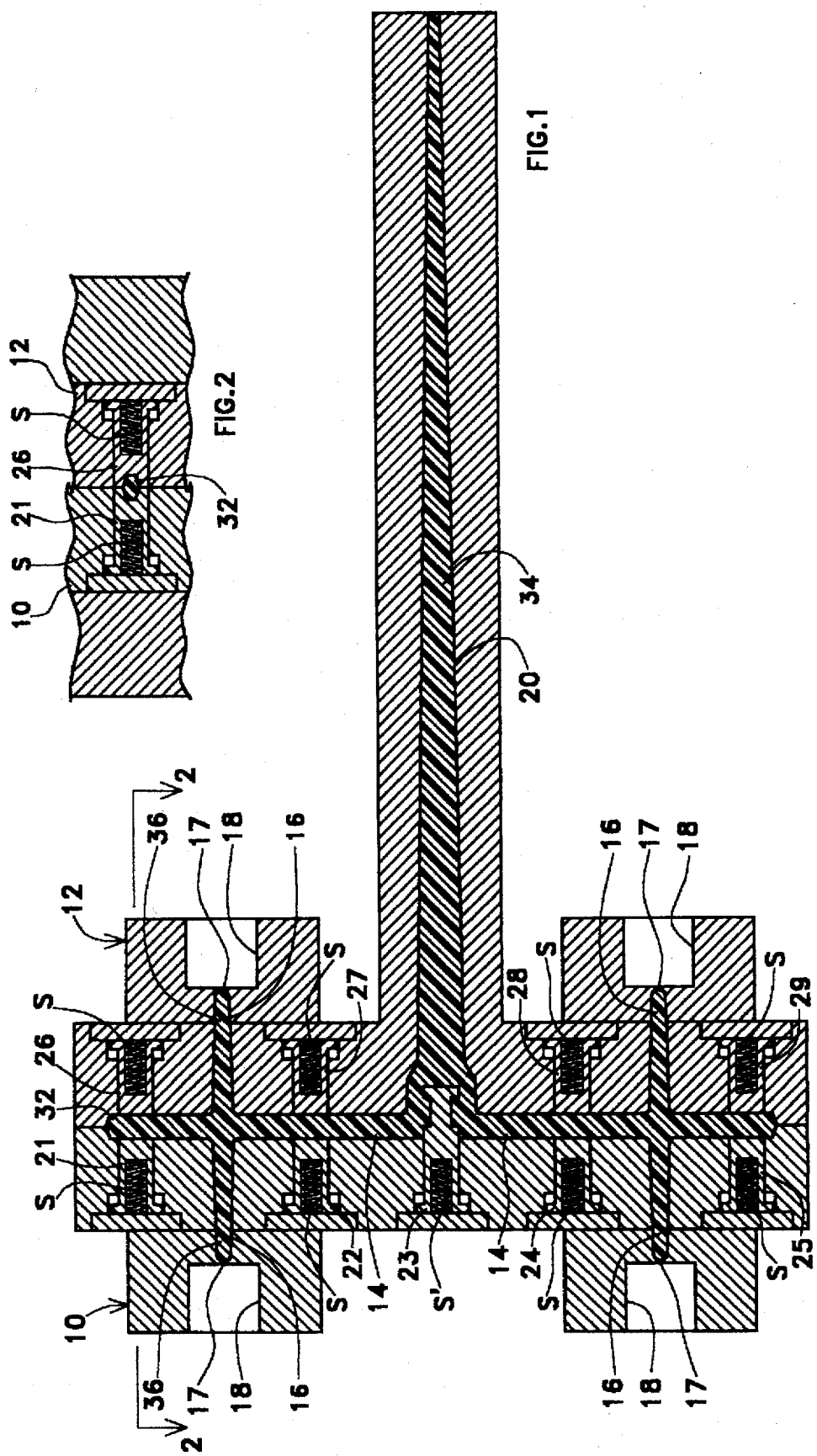

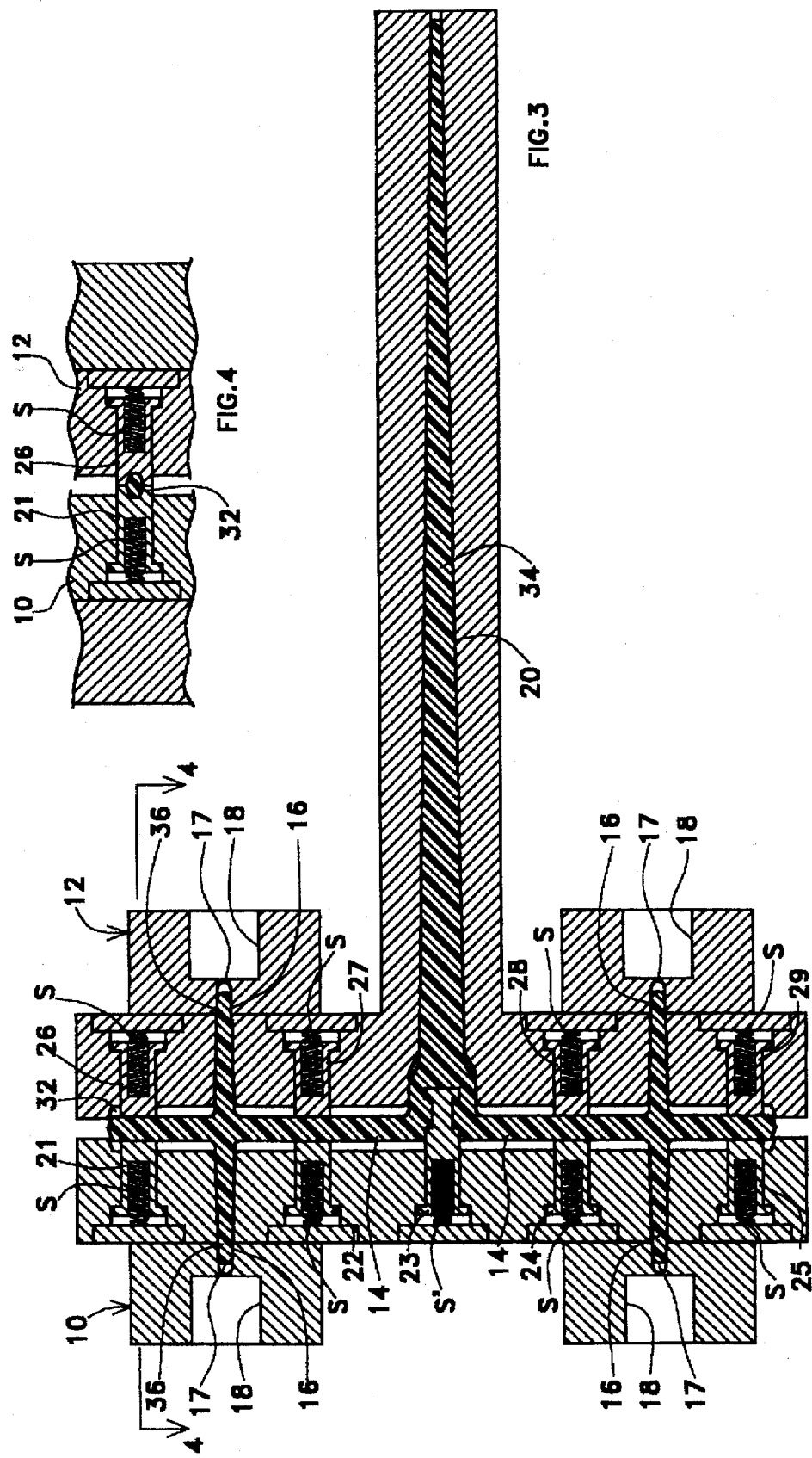

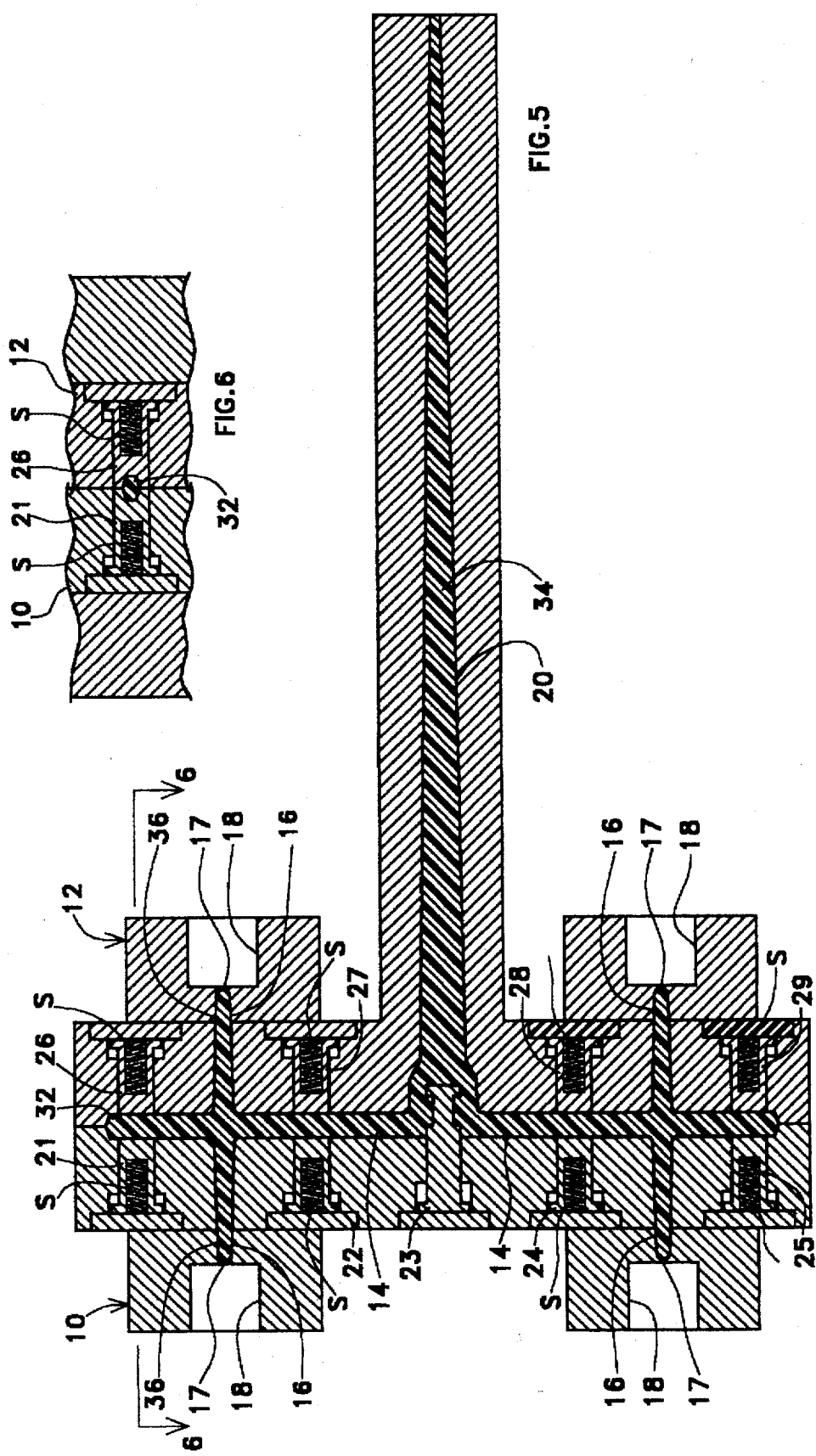

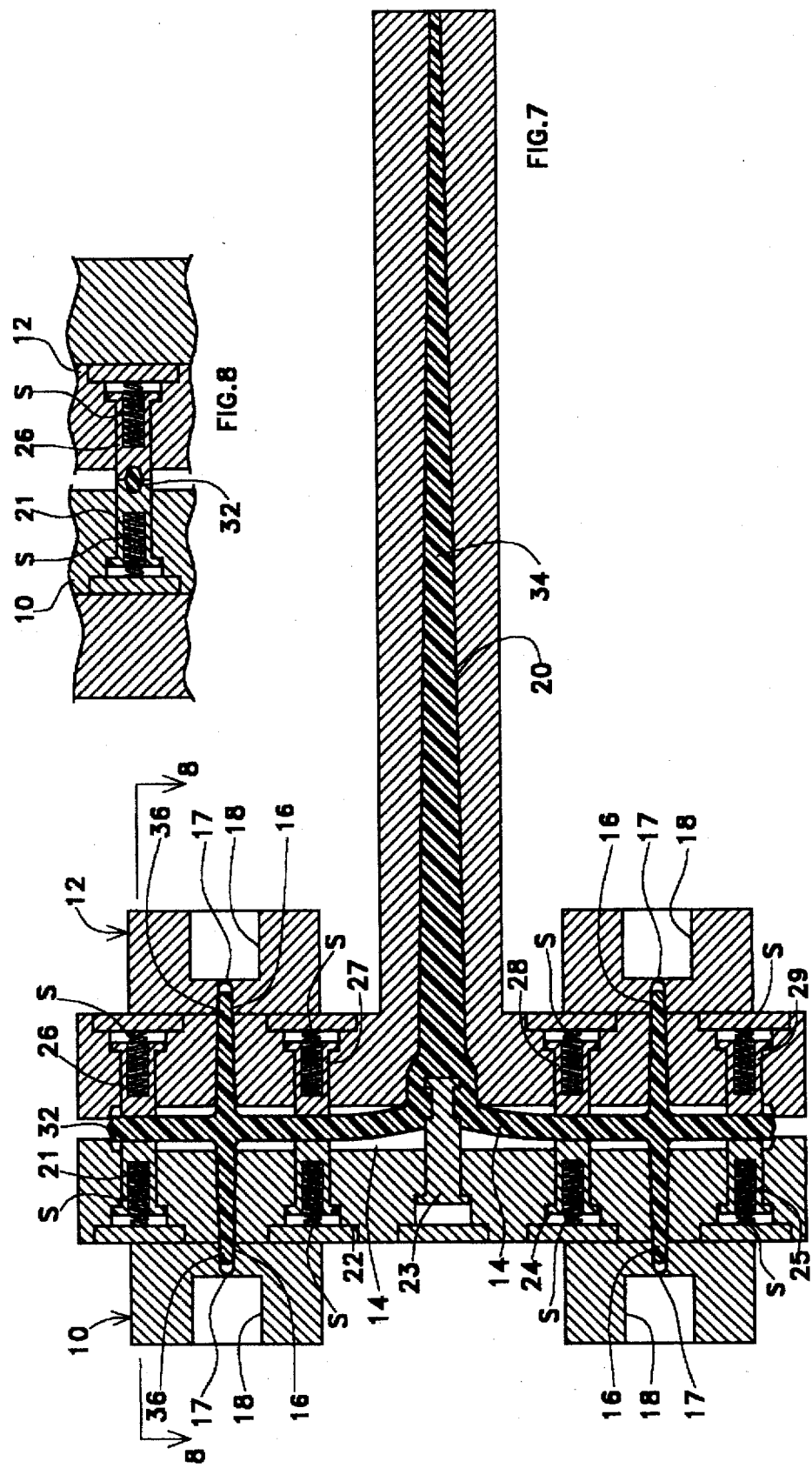

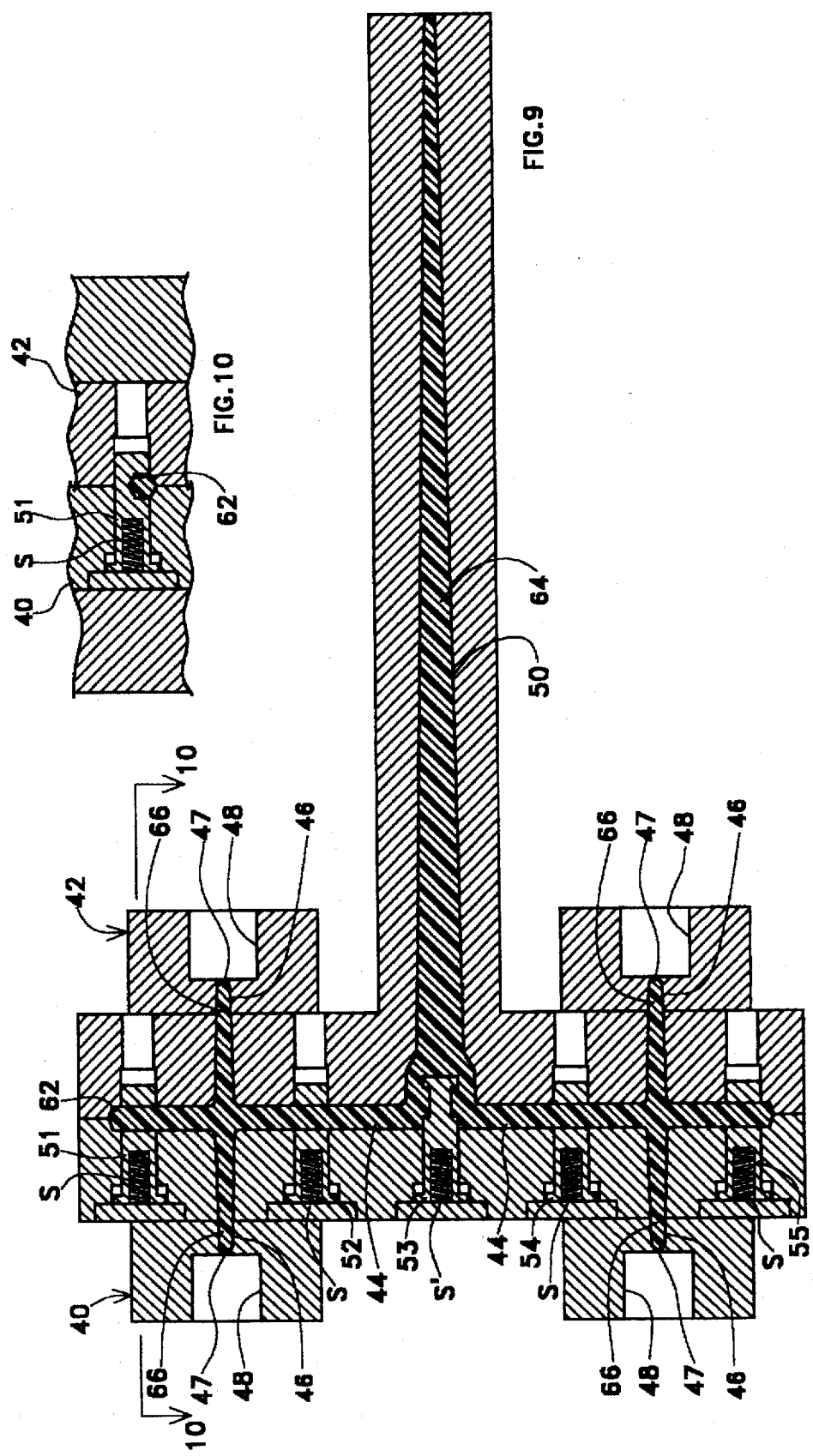

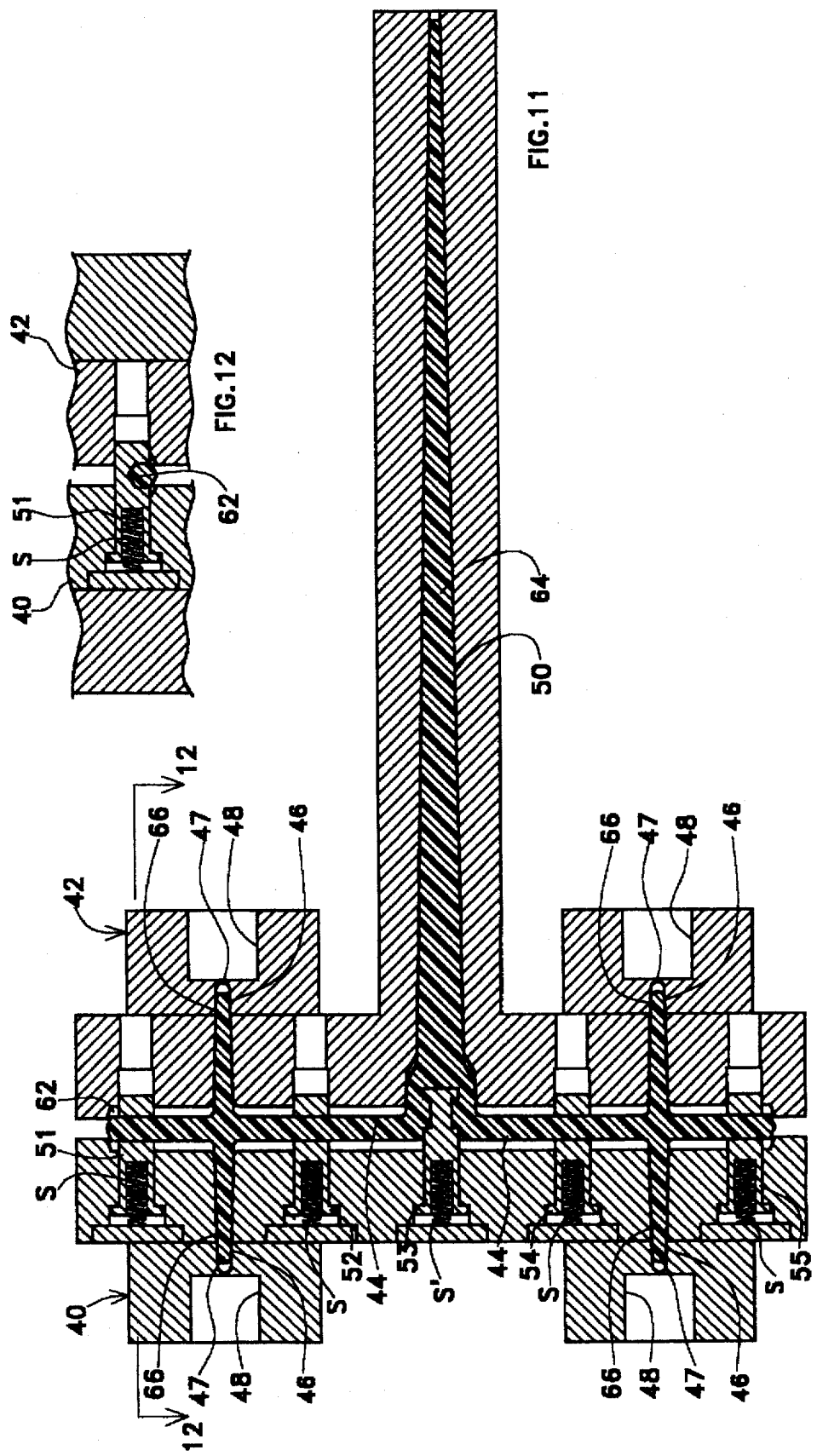

METHOD AND APPARATUS FOR RESTRAINING PLASTIC MATERIAL IN INSULATED RUNNER SYSTEM FROM CONTACTING MOLD PARTS UPON SEPARATION THEREOF

BACKGROUND OF THE INVENTION

The present invention generally pertains to injection molding of plastic material and is particularly directed to an improvement in an injection molding apparatus having an insulated runner system and a method of using the improved apparatus.

An injection molding apparatus includes a runner system through which molten plastic material flows to a gate from which the plastic material is injected into a mold cavity. When the mold parts that define the runner system are not heated, the runner system is known as an insulated runner system. The outer portion of the injected molten plastic material that flows through an insulated runner system solidifies as a result of contact with the mold parts that define the insulated runner system to thereby form a shell of plastic material through which molten plastic material flows. Whenever the molding cycle is interrupted, the shell becomes so thick as a result of such contact that the flow of the molten plastic material through the interior of the shell becomes so diminished that the mold parts defining the runner system must be fully separated to enable a sprue of the solidified plastic material to be removed from the runner system. It is an object of the present invention to reduce the rate at which the shell of plastic material within at least part of an insulated runner system becomes thicker.

SUMMARY OF THE INVENTION

The present invention provides an injection molding apparatus in which plastic material from a source is injected into at least one mold cavity, comprising first and second mold parts, which when combined define therebetween an insulated section of a runner system through which molten plastic material from the source is injected into the at least one mold cavity; and restraining means included in at least one of the first and second mold parts for restraining a shell of plastic material within at least a part of said insulated section of the runner system from contacting any portion of at least one of the mold parts within said insulated section of the runner system other than the restraining means when the first and second mold parts are separated from one another. By separating the mold parts when plastic material is not being injected from the gate into the mold cavities and so restraining such contact during such separation, the rate at which the shell of plastic material within at least such part of the insulated runner system becomes thicker is reduced.

The present invention also provides an injection molding method in which plastic material from a source is injected into at least one mold cavity, comprising the steps of:
(a) combining first and second mold parts to define therebetween an insulated section of a runner system through which molten plastic material from the source is injected into at least one mold cavity;
(b) separating the first and second mold parts from one another; and
(c) restraining a shell of plastic material within at least a part of said insulated section of the runner system from contacting any portion of at least one of the mold parts within said insulated section of the runner system other than means for effecting said restraint when the first and second mold parts are separated from one another.

Additional features of the present invention are described with reference to the detailed description of the preferred embodiments.

BRIEF DESCRIPTION OF THE DRAWING

FIG. 1 is a sectional view of a portion of one preferred embodiment of an insulated runner system in an apparatus according to the present invention when the mold parts between which the runner system is defined are in contact with one another.

FIG. 2 is a sectional view of a segment of the apparatus shown in FIG. 1 taken along line 2—2 in FIG. 1.

FIG. 3 is a sectional view of the apparatus shown in FIG. 1 when the mold parts are separated from one another.

FIG. 4 is a sectional view of a segment of the apparatus shown in FIG. 3 taken along line 4—4 in FIG. 3.

FIG. 5 is a sectional view of a portion of another preferred embodiment of an insulated runner system in an apparatus according to the present invention when the mold parts between which the runner system is defined are in contact with one another.

FIG. 6 is a sectional view of a segment of the apparatus shown in FIG. 5 taken along line 6—6 in FIG. 5.

FIG. 7 is a sectional view of the apparatus shown in FIG. 5 when the mold parts are separated from one another.

FIG. 8 is a sectional view of a segment of the apparatus shown in FIG. 7 taken along line 8—8 in FIG. 7.

FIG. 9 is a sectional view of a portion of a further preferred embodiment of an insulated runner system in an apparatus according to the present invention when the mold parts between which the runner system is defined are in contact with one another.

FIG. 10 is a sectional view of a segment of the apparatus shown in FIG. 9 taken along line 10—10 in FIG. 9.

FIG. 11 is a sectional view of the apparatus shown in FIG. 9 when the mold parts are separated from one another.

FIG. 12 is a sectional view of a segment of the apparatus shown in FIG. 11 taken along line 12—12 in FIG. 11.

DETAILED DESCRIPTION

Referring to FIGS. 1-4, one preferred embodiment of an injection molding apparatus according to the present invention includes a first mold part 10 and a second mold part 12. When the first mold part 10 and the second mold part 12 are combined a branch channel 14 of an insulated section of a runner system is defined between the first mold part 10 and the second mold part 12. Within the first mold part 10 and the second mold part 12, there are a plurality of drop channels 16 extending from the branch channel 14 to a plurality of gates 17 adjacent a plurality of mold cavities 18 respectively. Within the second mold part 12 there is a stem channel 20 through which molten plastic material flows into the branch channel 14.

The first mold part 10 includes a first plunger 21, a second plunger 22, a third plunger 23, a fourth plunger 24 and a fifth plunger 25. The second mold part 12 includes a sixth plunger 26, a seventh plunger 27, an eighth plunger 28 and a ninth plunger 29. Each of these plungers is disposed for movement toward and away from the branch channel 14 and is biased by a spring S for movement toward the branch channel 14.

The first plunger 21 is disposed in an opposing relationship to the sixth plunger 26. The second plunger 22 is disposed in an opposing relationship to the seventh plunger 27. The fourth plunger 24 is disposed in an opposing relationship to the eighth plunger 28. The fifth plunger 25 is disposed in an opposing relationship to the ninth plunger 29.

Each pair of plungers that are disposed in an opposing relationship to one another are forced by the respective springs S to contact one another and hold a respective segment of a branch 32 of a shell of plastic material therebetween both when the first mold part 10 and the second mold part 12 are in contact with one another, as shown in FIGS. 1 and 2, and when the first mold part 10 and the second mold part 12 are separated from one another, as shown in FIGS. 3 and 4.

The third plunger 23 is aligned with the stem channel 20 at the juncture of the stem channel 20 and the branch channel 14 and extends through the branch 32 and penetrates into a stem 34 of the shell of plastic material. The third plunger 23 is biased by a spring S' for movement toward the stem channel 20. The force provided by the spring S' is sufficient to cause the third plunger to move the branch 32 of the shell of plastic material away from the first mold part 10 when the first mold part 10 and the second mold part 12 are separated from one another, as shown in FIGS. 3 and 4.

The plungers 21, 22, 23, 24, 25, 26, 27, 28, 29 thereby restrain the branch 32 of the shell of plastic material from contacting any portion of the first mold part 10 and the second mold part 12 other than the plungers when the first mold part 10 and second mold part 12 are separated from one another. This preferred embodiment is used when the stem 34 of the plastic shell is able to slide longitudinally within the stem channel 20 as the first mold part 10 and the second mold part 12 are alternately separated from one another and moved together.

Each drop channel 16 is so disposed in relation to the branch channel 14 that when the first mold part 10 is separated from the second mold part 12, the restraint of the branch 32 of the shell of plastic material by the respective plungers causes drops 36 of the shell of plastic material in the drop channels 16 to be pulled away from the gates 17, whereby any drools of molten plastic material from the free ends of the drops 36 are collected within the drop channels 16 rather than in the gates 17 or the mold cavities 18; and the free ends of the drops 36 are not subjected to cooling by reason of contact with those portions of the first and second mold parts 10, 12 that are adjacent to and define the gates 17.

The penetration of the third plunger 23 into the stem 34 provides a grip upon the stem 34 that enables the stem 34 to pulled from the stem channel 20 after the molding cycle has been interrupted and the runner system has been fully opened to enable the sprue of solidified plastic material to be removed from the runner system.

Referring to FIGS. 5-8, the alternative preferred embodiment of the injection molding apparatus shown therein is used when the stem 34 of the plastic shell is not able to slide longitudinally within the stem channel 20 during the molding cycle, but instead is firmly held within the stem channel 20 as the first mold part 10 and the second mold part 12 are separated from one another and then recombined with one another. The preferred embodiment of FIGS. 5-8 includes the same components as the preferred embodiment of the apparatus shown in FIGS. 1-4 and operates in the same manner, except that the third plunger 23 is not biased by a spring, but instead is disposed for free longitudinal movement in accordance with the extent that the branch 32 of the shell of plastic material is separated from the first mold part in response to separation of the first mold part 10 and the second mold part 12 from one another; whereby when the first mold part 10 and the second mold part 12 are separated from one another, the stem 34 of the shell of plastic material, being firmly held within the stem channel 20, pulls the branch 32 of the shell of plastic material at the juncture of the stem 20 and the branch 32 away from the first mold part 10 and also pulls upon the third plunger 23.

After the molding cycle has been interrupted and the shell of plastic material has contracted so that the stem 34 is no longer so firmly held as to prevent longitudinal movement of the stem 34 within the stem channel 20, the grip of the third plunger 23 upon the stem 34 enables the stem 34 to be pulled from the stem channel 20 when the runner system is fully opened to enable the sprue of solidified plastic material to be removed from the runner system.

Referring to FIGS. 9-12, a further preferred embodiment of an injection molding apparatus according to the present invention includes a first mold part 40 and a second mold part 42. When the first mold part 40 and the second mold part 42 are combined a branch channel 44 of an insulated section of a runner system is defined between the first mold part 40 and the second mold part 42. Within the first mold part 40 and the second mold part 42, there are a plurality of drop channels 46 extending from the branch channel 44 to a plurality of gates 47 adjacent a plurality of mold cavities 48 respectively. Within the second mold part 42 there is a stem channel 50 through which molten plastic material flows into the branch channel 44.

The first mold part 40 includes a first plunger 51, a second plunger 52, a third plunger 53, a fourth plunger 54 and a fitch plunger 55. Each of these plungers is shaped to hold a segment of a branch 62 of the shell of plastic material. Each of these plungers is disposed for movement toward and away from the branch channel 14 and is biased by a spring S for movement toward the branch channel 44. Each of these plungers holds a segment of a branch 62 of the shell of plastic material both when the first mold part 40 and the second mold part 42 are in contact with one another, as shown in FIGS. 9 and 10, and when the first mold part 40 and the second mold part 42 are separated from one another, as shown in FIGS. 11 and 12.

The third plunger 53 is aligned with the stem channel 50 at the juncture of the stem channel 50 and the branch channel 44 and extends through the branch 62 and penetrates into a stem 64 of the shell of plastic material. The third plunger 23 is biased by a spring S' for movement toward the stem channel 50 and functions in the same manner as the third plunger 23 in the embodiment described hereinabove with reference to FIGS. 3 and 4.

The plungers 51, 52, 53, 54, 55 thereby restrain the branch 62 of the shell of plastic material from contacting any portion of the first mold part 40 and the second mold part 42 other than the plungers when the first mold part 40 and second mold part 42 are separated from one another. This preferred embodiment is used when the stem 64 of the plastic shell is able to slide longitudinally within the stem channel 50 as the first mold part 40 and the second mold part 42 are alternately separated from one another and moved together.

Each drop channel 46 is so disposed in relation to the branch channel 44 that when the first mold part 40 is separated from the second mold part 42, the restraint of the branch 62 of the shell of plastic material by the respective plungers causes drops 66 of the shell of plastic material in the drop channels 46 to be pulled away from the gates 47, whereby any drools of molten plastic material from the free ends of the drops 66 are collected within the drop channels 46 rather than in the gates 47 or the mold cavities 48; and the free ends of the drops 66 are not subjected to cooling by reason of contact with those portions of the first and second mold parts 40, 42 that are adjacent to and define the gates 47.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. An injection molding method in which plastic material from a source is injected into at least one mold cavity, comprising the steps of:
   (a) combining first and second mold parts to define therebetween an insulated section of a runner system through which molten plastic material from the source is injected into the at least one mold cavity;
   (b) separating the first and second mold parts from one another; and
   (c) restraining a shell of plastic material within at least a part of said insulated section of the runner system from contacting any portion of at least one of the mold parts within said insulated section of the runner system other than means for effecting said restraint when the first and second mold parts are separated from one another.

2. A method according to claim 1, wherein step (c) comprises restraining the shell of plastic material within said part of said insulated section of the runner system from contacting any portion of the mold parts within said insulated section of the runner system other than means for eftcoting said restraint when the first and second mold parts are separated from one another.

3. An injection molding apparatus in which plastic material from a source is injected into at least one mold cavity, comprising
   first and second mold parts, which when combined define therebetween an insulated section of a runner system through which molten plastic material from the source is injected into the at least one mold cavity; and
   restraining means included in at least one of the first and second mold parts for restraining a shell of plastic material within at least a part of said insulated section of the runner system from contacting any portion of at least one of the mold parts within said insulated section of the runner system other than the restraining means when the first and second mold parts are separated from one another.

4. An apparatus according to claim 3, wherein the restraining means restrain the shell of plastic material within said part of said insulated section of the runner system from contacting any portion of the first and second mold parts other than the restraining means when the first and second mold parts are separated from one another.

5. An apparatus according to claim 3, wherein the restraining means comprise
   a first plunger in the first mold part;
   a second plunger in the second mold part, with the first and second plungers being disposed in an opposing relationship to one another; and
   means for forcing the first plunger and the second plunger to contact one another and hold the shell of plastic material therebetween both when the first and second mold parts are in contact with one another and when the first and second mold parts are separated from one another.

6. An apparatus according to claim 5, wherein, when the first and second mold parts are not separated from one another, the first and second plungers define therebetween a segment of said part of said insulated section of the runner system.

7. An apparatus according to claim 6, comprising a plurality of pairs of said first and second plungers, which, when the first and second mold parts are not separated from one another, respectively define therebetween separate segments of said part of said insulated section of the runner system.

8. An apparatus according to claim 3, wherein the restraining means comprise
   a plurality of first plungers in the first mold part;
   a plurality of second plungers in the second mold part, with pairs of the first and second plungers being disposed respectively in an opposing relationship to one another; and
   means for forcing the first plungers and the second plungers to contact one another and hold the shell of plastic material therebetween both when the first and second mold parts are in contact with one another and when the first and second mold parts are separated from one another.

9. An apparatus according to claim 3, wherein the restraining means comprise
   a plunger disposed in the first mold part and shaped to hold a shell of plastic material within said part of the insulated section of the runner system; and
   means for forcing the plunger to move the held shell away from contact with any portion of at least one of the mold parts within said insulated section of the runner system other than the plunger when the first and second mold parts are separated from one another.

10. An apparatus according to claim 9, wherein, when the first and second mold parts are not separited from one another, the plunger defines a segment of said part of said insulated section of the runner system.

11. An apparatus according to claim 3, wherein the restraining means comprise
    a plunger disposed in the first mold part and shaped to hold a shell of plastic material within said part of the insulated section of the runner system; and
    means for forcing the plunger to move the held shell away from contact with any portion of the mold parts within said insulated section of the runner system other than the plunger when the first and second mold parts are separated from one another.

12. An apparatus according to claim 11, wherein, when the first and second mold parts are not separated from one another, the plunger defines a segment of said part of said insulated section of the runner system.

13. An apparatus according to claim 3, wherein the restraining means comprise
    a plurality of plungers disposed in the first mold part and shaped to hold a shell of plastic material within said part of the insulated section of the runner system; and
    means for forcing the plungers to move the held shell away from contact with any portion of at least one of the mold parts within said insulated section of the runner system other than the plungers when the first and second mold parts are separated from one another.

14. An apparatus according to claim 13, wherein, when the first and second mold parts are not separated from one another, the plungers defines separate segment of said part of said insulated section of the runner system.

15. An apparatus according to claim 3, wherein the restraining means comprise
- a plurality of plungers disposed in the first mold part and shaped to hold a shell of plastic material within said part of the insulated section of the runner system; and
- means for forcing the plungers to move the held shell away from contact with any portion of the mold parts within said insulated section of the runner system other than the plungers when the first and second mold parts are separated from one another.

16. An apparatus according to claim 15, wherein, when the first and second mold parts are not separated from one another, the plungers defines separate segment of said part of said insulated section of the runner system.

17. An apparatus according to claim 3, wherein the runner system includes a drop channel through which injected molten plastic material can flow to a gate that is adjacent a mold cavity from said part of the runner system in which contact of the shell of plastic material with said portion of at least one of the mold parts is restrained when the first and second mold parts are separated from one another;
- wherein the drop channel is so disposed in relation to said part of the runner system that when the mold parts are separated, said restraint of the shell of plastic material by the restraining means causes a drop of the shell of plastic material in the drop channel to be pulled away from the gate.

* * * * *